Nov. 21, 1939.    S. STANWORTH ET AL    2,180,774
GAS FIRED FURNACE
Filed Aug. 2, 1939    2 Sheets-Sheet 2

INVENTORS
Stephen Stanworth
James Stanworth
By: Stevens
ATTY.

Patented Nov. 21, 1939

2,180,774

UNITED STATES PATENT OFFICE 2,180,774

GAS FIRED FURNACE

Stephen Stanworth and James Stanworth, Burnley, England

Application August 2, 1939, Serial No. 288,024
In Great Britain August 3, 1938

1 Claim. (Cl. 263—14)

This invention relates to a gas fired furnace that is applicable to the melting, or heating of metals, or maintaining them in a molten or heated condition, or to the heating of other substances or materials, and has for its object to introduce an improved construction which will be more economical in the use of gas and less injurious to refractory linings, and to crucibles or receptacles when used, whilst maintaining a high or increased state of efficiency.

According to this invention air under pressure is passed between adjacent surfaces of a heat resisting metal tube and a refractory brick-work core and through openings in the latter to a passage or passages that enter the furnace tangentially or otherwise and at one end of such passage or passages is a gas burner or nozzle through which gas issues at a high velocity and burns at the mouth of the nozzle without pre-admixture with air and continues to burn in such passage or passages and in the furnace, the products of combustion from which pass between adjacent surfaces of the heat resisting metal tube and a surrounding refractory brick-work wall to an exhaust. The air and gas supplies are controlled by valves that are so constructed and interconnected that the correct supply of air is provided for each setting of the gas valve.

Figure 1:
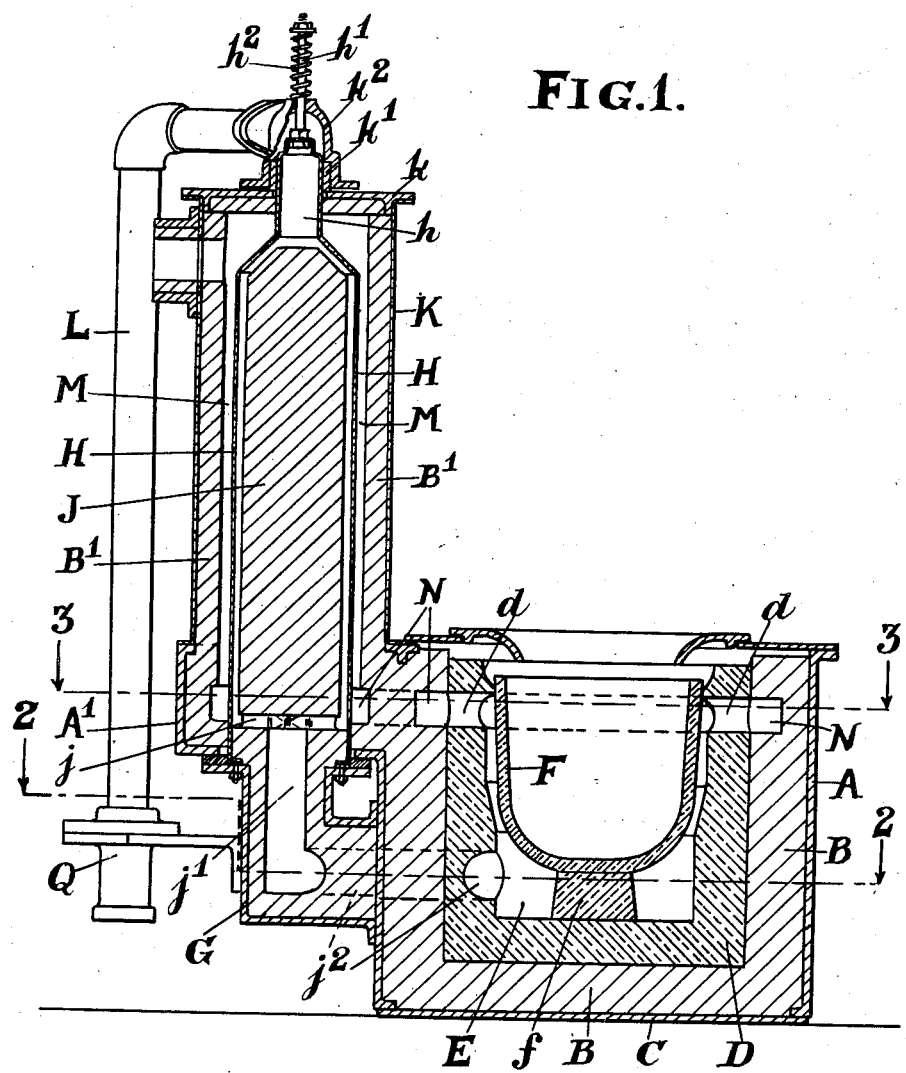
Fig. 1 is a vertical section of a gas fired furnace constructed in accordance with this invention.
Figure 2:
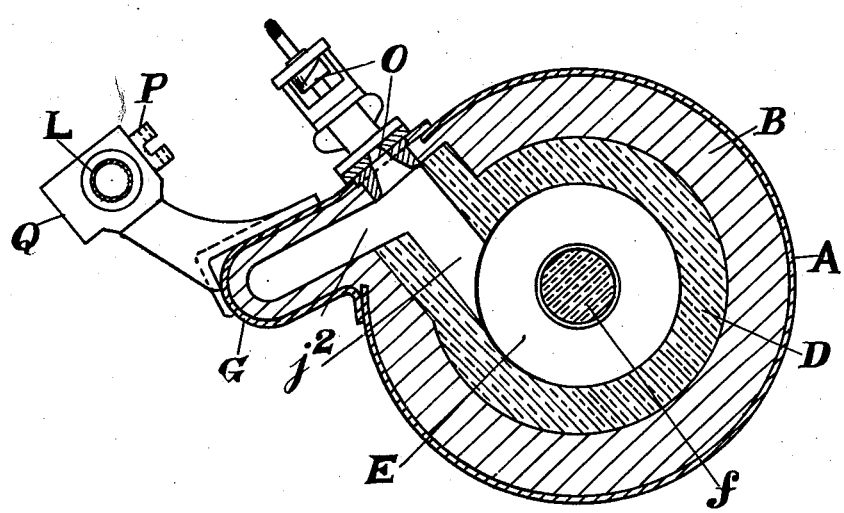
Fig. 2 is a section taken on line 2—2 of Fig. 1.
Figure 3:
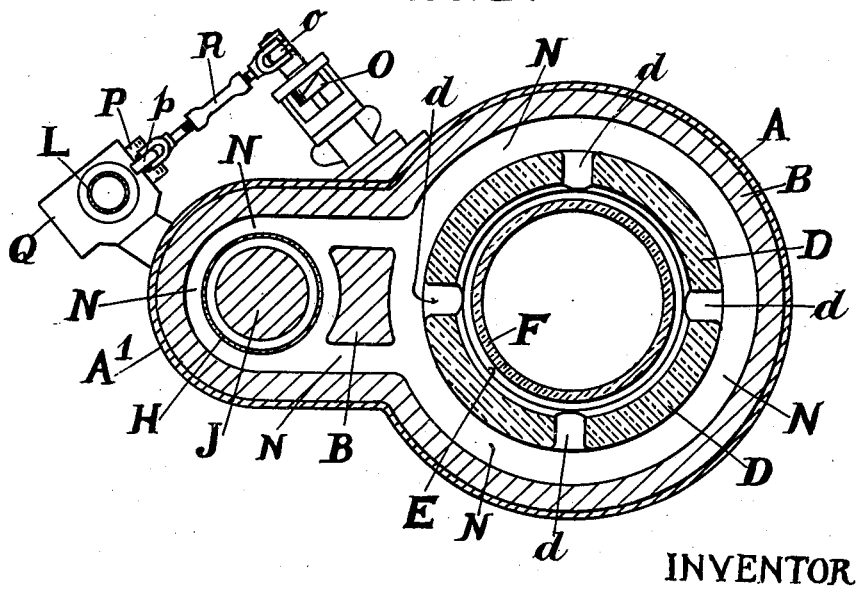
Fig. 3 is a similar view taken on line 3—3 of Fig. 1.

In the construction shown the furnace comprises a cylindrical metal casing A containing a lining B of brick-work or other heat insulating material extending within the whole of the casing and over the bottom C. Inside this lining is another lining D of refractory material which constitutes the furnace E and in which a crucible or basin F for the metal to be melted is placed and may rest upon a block such as $f$. The metal casing has an extension A at one side with an opening at the top and the bottom, and attached to the metal casing so as to communicate with the bottom opening is a tubular elbow G to the upper end of which is detachably connected the bottom end of the heat resisting metal tube H in which is situated the above mentioned core J. The lower end of this core is formed with radial passages $j$ communicating with an axial passage $j^1$ leading to the passage $j^2$ that enters the furnace E tangentially. The metal tube H terminates at the top in a cylindrical passage $h$ that passes freely through the top of a cover $k$ for a metal casing K and communicates with the pipe L to which air is supplied under pressure. The metal tube H is maintained in a state of suspension or partial suspension by a bolt $h^1$ and spring $h^2$ and forms a sliding connection with a sleeve $k^1$ that is held between the cover $k$ and a cap $k^2$ that is bolted to the top of the casing, the sliding connection providing for the expansion and contraction of the tube H. The lower end of the casing K is attached to the lateral extension $A^1$ of the furnace casing and contains a refractory or insulating brick-work lining $B^1$ that extends into proximity to the heat resisting metal tube H and leading from the passage M that is formed between such parts is an exhaust passage N which communicates with the furnace E through openings $d$ in the furnace lining D. To enable the correct supply of air to be provided for each setting of the gas valve O a damper P is slidably mounted in a box Q in the air supply pipe L and is connected by an adjustable link B and levers $o$ and $p$ with the gas valve O and damper P. The lever arms for actuating the gas valve and damper may be formed with a number of holes for adjustable connection with the link R and the latter may be made in two portions provided with a right and left hand thread connected together by a turn buckle for adjusting the length of the link.

What we claim as our invention and desire to secure by Letters Patent in the United States is:

In a gas fired furnace, a heating chamber, a heat resisting metal tube situated at one side thereof, a refractory brick-work core situated within the tube, an air passage extending between the core and the tube, an air pipe connected with the tube for supplying air under pressure to the said passage, openings in the core leading to a passage arranged in open communication with the heating chamber, a casing surrounding a metal tube and spaced a short distance therefrom to form a passage, and a passage leading from the heating chamber to the said passage and through an opening in the latter to an exhaust, a gas burner nozzle situated in the passage through which compressed air is delivered to the heating chamber, a valve for controlling the supply of gas to the burner, a damper for controlling the supply of air under pressure, means for connecting the valve and damper and means for effecting independent adjustment thereof.

STEPHEN STANWORTH.
JAMES STANWORTH.